(12) United States Patent
Kamada et al.

(10) Patent No.: US 8,059,248 B2
(45) Date of Patent: Nov. 15, 2011

(54) LIQUID CRYSTAL DISPLAY DEVICE

(75) Inventors: Takamitsu Kamada, Mobara (JP); Hiroaki Asuma, Mobara (JP); Susumu Edo, Mobara (JP); Kenji Kitajima, Oamishirasato (JP)

(73) Assignee: Hitachi Displays, Ltd., Chiba (JP)

( * ) Notice: Subject to any disclaimer, the term of this patent is extended or adjusted under 35 U.S.C. 154(b) by 320 days.

(21) Appl. No.: 12/548,774

(22) Filed: Aug. 27, 2009

(65) Prior Publication Data

US 2010/0053531 A1 Mar. 4, 2010

(30) Foreign Application Priority Data

Aug. 29, 2008 (JP) .................................. 2008-222314

(51) Int. Cl.
*G02F 1/1345* (2006.01)

(52) U.S. Cl. ......... 349/149; 349/123; 349/126; 349/139

(58) Field of Classification Search .................... 349/42, 349/43, 56, 123, 124, 125, 126, 139, 141, 349/142, 148, 149
See application file for complete search history.

(56) References Cited

U.S. PATENT DOCUMENTS

| 6,034,757 | A | 3/2000 | Yanagawa et al. ............ 349/141 |
| 6,774,969 | B2* | 8/2004 | Ma et al. ....................... 349/139 |
| 7,476,937 | B2* | 1/2009 | Kawasaki et al. ............. 257/347 |
| 2007/0152372 | A1* | 7/2007 | Chae et al. ..................... 264/320 |
| 2010/0053531 | A1* | 3/2010 | Kamada et al. ............... 349/149 |

FOREIGN PATENT DOCUMENTS

JP 09-105918 4/1997
* cited by examiner

*Primary Examiner* — Brian Healy
(74) *Attorney, Agent, or Firm* — Antonelli, Terry, Stout & Kraus, LLP.

(57) ABSTRACT

The TFT substrate includes a conductive region electrically conducted to the transparent conductive film and a terminal region, on a first side not covered with the counter substrate. The terminal region includes a ground terminal connected to the conductive region and an adjacent terminal which is adjacent to the ground terminal and supplies signals or power source to the peripheral circuit. The adjacent terminal is connected to the peripheral circuit through a first wiring installed along a third side of the TFT substrate toward a second side facing the first side. The first wiring is extended to a middle point of the third side and then connected to the peripheral circuit.

7 Claims, 6 Drawing Sheets

LIQUID CRYSTAL DISPLAY DEVICE

The present application claims priority from Japanese application JP 2008-222314 filed on Aug. 29, 2008, the content of which is hereby incorporated by reference into this application.

BACKGROUND OF THE INVENTION

1. Field of the Invention

The present invention relates to a liquid crystal display device provided with a transparent conductive film on an outer surface of a counter substrate.

2. Background Art

Liquid crystal display devices include a liquid crystal panel having a liquid crystal layer and a pair of transparent substrates (counter substrate and TFT substrate) sandwiching the liquid crystal layer therebetween.

In a liquid crystal display device of a lateral electric field type (In-Plane Switching: IPS), both of a pixel electrode and a common electrode are formed on the TFT substrate. In such a liquid crystal display device of the lateral electric field type, static electricity from a display surface side (counter substrate side) of a liquid crystal panel affects an electric field controlling a liquid crystal layer to cause abnormality in display, as shown in JP-A-9-105918. Therefore, a transparent conductive film is provided on an outer surface (surface on a side opposite to the liquid crystal layer) of the counter substrate for shielding from the static electricity or the like. The transparent conductive film is connected to a terminal for conduction (hereinafter referred to as conductive region) provided on the TFT substrate through a conductive member as shown in, for example, FIG. 12 of JP-A-9-105918 (US family is U.S. Pat. No. 6,034,757). A ground potential is supplied from, for example, a flexible printed board (hereinafter referred to as FPC) to the transparent conductive film through the conductive region.

SUMMARY OF THE INVENTION

However, in a rubbing step of forming an alignment film of the liquid crystal layer, generation of charges in the conductive region due to fibers for rubbing extends the conductive region, so that a larger amount of charges are liable to be generated. Thus, the charges suddenly flow to a terminal (hereinafter referred to as adjacent terminal) adjacent to the terminal which supplies a ground potential from the FPC to the conductive region, causing dielectric breakdown in a peripheral circuit connected to the adjacent terminal in some cases.

Figure 6:
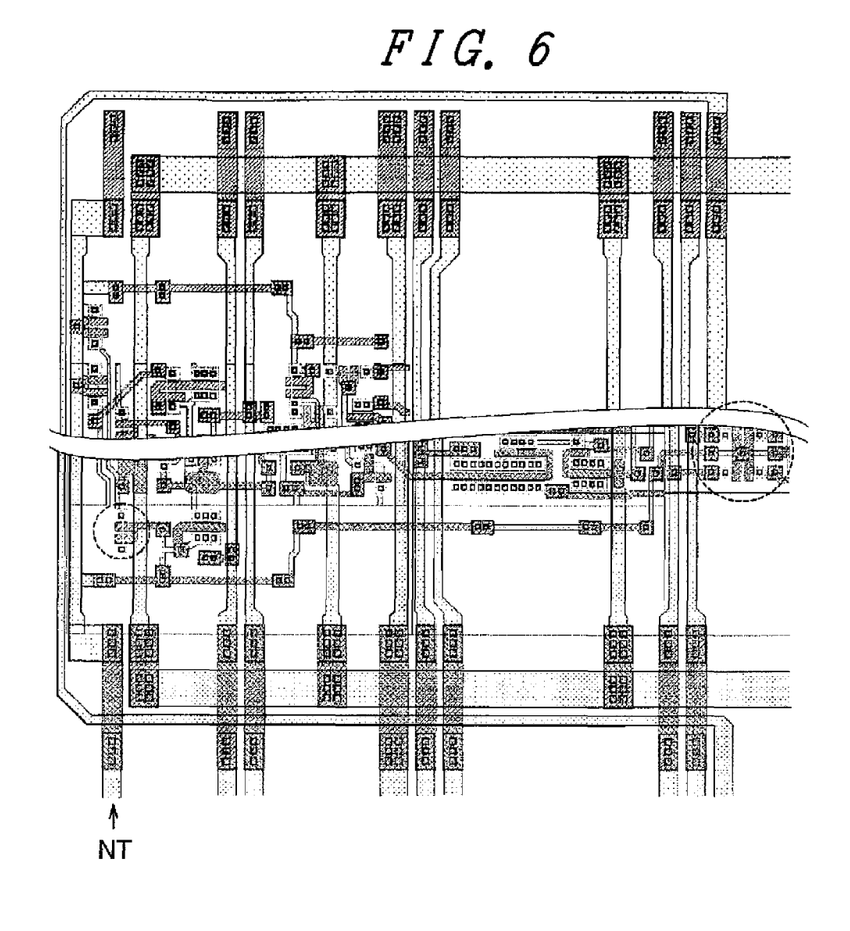
FIG. 6 shows an example a layout of a part of a peripheral circuit of a TFT substrate SUB in a conventional liquid crystal display device.

Specifically, for example, as shown in a layout diagram of a peripheral circuit provided on the left side of a pixel circuit in FIG. 6, dielectric breakdown occurs in thin film transistors which are directly supplied with a signal from an adjacent terminal NT and indicated by broken circles.

In view of the above problem, it is a merit of the invention to provide a liquid crystal display device in which a peripheral circuit formed on a TFT substrate is less subjected to dielectric breakdown in a rubbing step.

(1) In order to solve the above problem, a liquid crystal display device according to the invention includes: a TFT substrate on which a pixel circuit and peripheral circuits of the pixel circuit are formed; and a counter substrate which is arranged to face the TFT substrate with a liquid crystal layer sandwiched between the counter substrate and the TFT substrate and has an area smaller than that of the TFT substrate, wherein the TFT substrate includes an alignment film subjected to a rubbing treatment, the counter substrate includes a transparent conductive film covering at least a region where the pixel circuit is formed in the TFT substrate on a surface opposite to the liquid crystal layer, the TFT substrate includes a conductive region electrically conducted to the transparent conductive film through a conductive member and a terminal region connected to a flexible printed board, on a first side which is not covered with the counter substrate, the terminal region includes a ground terminal which is connected to the conductive region for supplying a ground potential and an adjacent terminal which is adjacent to the ground terminal and supplies signals or power source to the peripheral circuit, the adjacent terminal is connected to the peripheral circuit provided on a third side through a first wiring which is installed along the third side from the first side toward the second side facing the first side, and the first wiring is extended at least to a position which is a middle point of the third side in the TFT substrate in a direction from the first side toward the second side and then connected to the peripheral circuit.

(2) In the liquid crystal display device of (1), the peripheral circuit connected to the adjacent terminal includes a second wiring which is installed from a position of connecting the first wiring toward the first side, and a first thin film transistor having a gate electrode insulated from a source electrode and a drain electrode, among thin film transistors directly supplied with signals from the adjacent terminal, is connected to any electrode of the source electrode, the drain electrode, and the gate electrode through the second wiring.

(3) In the liquid crystal display device of (2), the second wiring is connected to at least one diode-connected second thin film transistor between a position of connecting the first wiring and a position of connecting the first thin film transistor.

(4) In the liquid crystal display device any one of (1) to (3), the first wiring is extended at least to a position which is closer to the second side than the region where the pixel circuit is formed in the TFT substrate and connected to the peripheral circuit.

(5) In the liquid crystal display device any one of (1) to (4), the pixel circuit includes a plurality of scanning signal lines, and the adjacent terminal supplies a start pulse for a circuit driving the scanning signal line.

(6) In the liquid crystal display device any one of (1) to (5), the pixel circuit includes a plurality of common signal lines, and the peripheral circuit connected to the adjacent terminal AC-drives the common signal line.

(7) In the liquid crystal display device any one of (1) to (6), the peripheral circuit includes a symmetrical peripheral circuit which is paired with the peripheral circuit connected to the first wiring and provided on a fourth side which is a position symmetrical to the peripheral circuit with the region where the pixel circuit is formed as a reference, the symmetrical peripheral circuit is supplied with signals or power source through a symmetrical wiring which is installed along the fourth side from the first side toward the second side, and the symmetrical wiring is extended at least to a position which is a middle point of the fourth side in the TFT substrate in a direction from the first side toward the second side and then connected to the symmetrical peripheral circuit.

By the liquid crystal display device mentioned above, a peripheral circuit formed on a TFT substrate is less subjected to dielectric breakdown in a rubbing step.

DESCRIPTION OF THE PREFERRED EMBODIMENTS

Hereinafter, embodiments of the invention will be described with reference to the drawings.

First Embodiment

Figure 1:
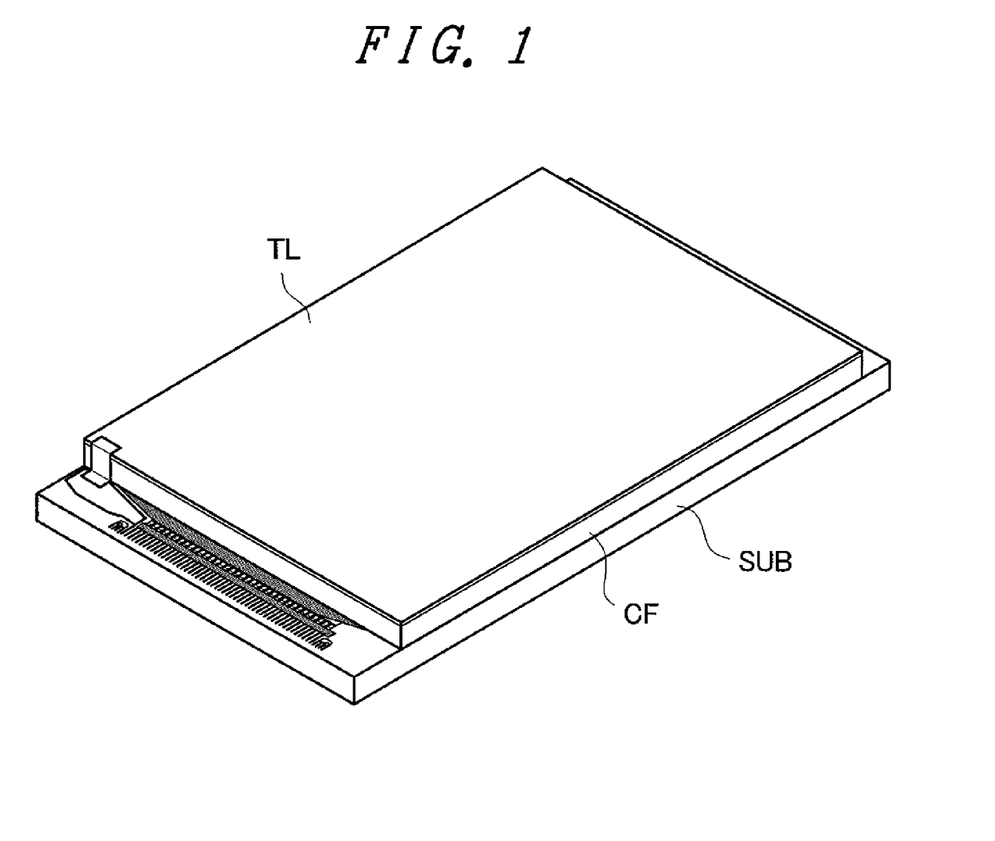
FIG. 1 is a perspective view of a liquid crystal panel provided with a TFT substrate and a counter substrate according to a first embodiment of the invention.

FIG. 1 is a perspective view of a liquid crystal panel included in a liquid crystal display device according to a first embodiment of the invention. The liquid crystal panel is included in a liquid crystal display device of an in-plane switching (IPS) type. A TFT substrate SUB and a counter substrate CF are each formed of a glass substrate and include a liquid crystal layer (not shown) sandwiched therebetween.

In the TFT substrate SUB, a pixel circuit having a plurality of pixels arranged in a matrix and peripheral circuits of the pixel circuit are formed on a surface on a liquid crystal layer side. In the pixel circuit of the TFT substrate SUB, for example, a plurality of scanning signal lines extending in the X-direction and arranged in parallel with one another in the Y-direction at equal intervals, a plurality of common signal lines arranged in parallel with the scanning signal lines at predetermined intervals, and a plurality of video signal lines extending in the Y-direction and arranged in parallel with one another in the X-direction at equal intervals. These signal lines define each pixel. In each of the defined pixels, a thin film transistor having a metal-insulator-semiconductor (MIS) structure is formed. The thin film transistor is driven by a signal from the scanning signal line, and a signal from the video signal line is supplied to a pixel electrode via the thin film transistor. A common electrode is connected to the common signal line. The potential difference between the pixel electrode and the common electrode generates a lateral electric filed, which drives liquid crystal to perform display.

On a surface of the counter substrate CF on a liquid crystal layer side, a color filter layer in which three primary colors (RGB) of light are arranged so as to face each of the pixels formed on the TFT substrate SUB is provided.

The liquid crystal layer is provided so as to be interposed between the TFT substrate SUB and the counter substrate CF. The liquid crystal layer is a layer having liquid crystal molecules which have both fluidity of liquid and optical properties of solid (crystal) and whose direction is changed due to voltage or the like to control the optical state. Optical transmittance in each pixel is controlled by the above-described lateral electric field. An alignment film for aligning the liquid crystal molecules included in the liquid crystal layer in a predetermined direction is formed at portions where the liquid crystal layer is sandwiched between the TFT substrate SUB and the counter substrate CF facing each other.

On a surface of the counter substrate CF on a side opposite to the liquid crystal layer, a transparent conductive film TL is formed of, for example, indium tin oxide (ITO) so as to cover a region where the counter substrate CF sandwiches the liquid crystal layer with the TFT substrate. The transparent conductive film TL is formed on the counter substrate CF so as to cover at least a region where the pixel circuit is formed on the TFT substrate for preventing the influence of static electricity or the like from the outside of the liquid crystal panel on the liquid crystal layer. The transparent conductive film TL in the embodiment is formed over the entire surface on the side opposite to the liquid crystal layer or substantially the entire surface (region covering at least a display region) as shown in FIG. 1.

Figure 2:
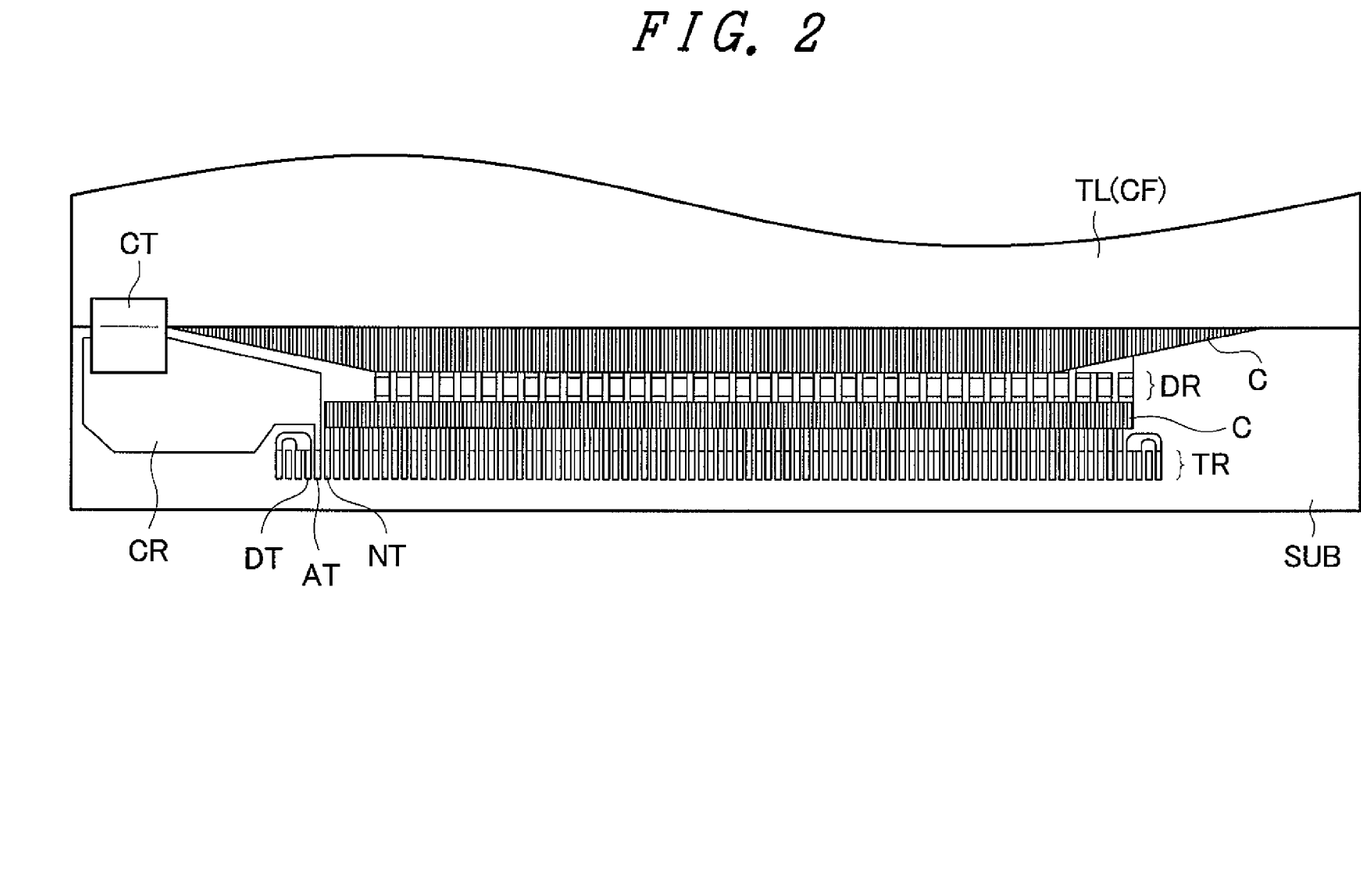
FIG. 2 is a top view of a portion where the TFT substrate exposes from the counter substrate in the liquid crystal panel in FIG. 1.

FIG. 2 is a top view of a portion where the TFT substrate SUB exposes from the counter substrate CF in the liquid crystal panel in FIG. 1. The counter substrate CF is formed to have an area smaller than that of the TFT substrate SUB, covering a part of the TFT substrate SUB. A region of the TFT substrate SUB which is not covered with the counter substrate CF is formed on a first side of the TFT substrate SUB, and a terminal region TR is formed on that region. In the terminal region TR, a plurality of terminals are arranged in parallel along one side of the TFT substrate for supplying signals or power source to the pixel circuit or the peripheral circuits. In addition, an FPC is crimp-connected to the terminal region TR via, for example, an anisotropic conductive layer. Signals or power source are supplied from the FPC to drivers (semiconductor chips, for example) of a driver region DR, the peripheral circuits, the pixel circuit, and the like.

On the first side of the TFT substrate SUB where the terminal region TR is formed, a conductive region (conductive pad) CR is formed so as to be electrically conducted via a conductive member CT to the transparent conductive film TL which shields the liquid crystal layer from the influence of static electricity or the like. The conductive region CR is formed in the vicinity of the step between the counter substrate CF and the TFT substrate SUB as shown in FIG. 2. The conductive region CR is electrically conducted to the transparent conductive film TL through, for example, a conductive resin or a conductive tape which is one kind of the conductive member CT.

The conductive region CR is connected to a ground terminal AT formed in the terminal region TR, whereby a ground potential is supplied from the FPC. Thus, static electricity generated outside the liquid crystal panel and charged on the transparent conductive film TL is removed through the conductive member CT and the conductive region CR. As shown in FIG. 2, the ground terminal AT is one terminal of a group of terminals arranged in parallel at predetermined intervals in the terminal region TR. There is an adjacent terminal NT which is adjacent to the ground terminal AT. The adjacent terminal NT is present on one side or both sides of one ground terminal AT. In the embodiment, the ground terminal AT is adjacent to the adjacent terminal NT which is connected to a peripheral circuit for supplying signals or power source to the same and adjacent to a dummy adjacent terminal DT whose terminal shape is formed as a dummy and which is not connected to a peripheral circuit or the like. The terminals in the terminal region TR are connected to the pixel circuit and the peripheral circuits provided between the counter substrate CF and the TFT substrate SUB through wiring regions C and the driver region DR.

Before a step of bonding the counter substrate CF with the TFT substrate SUB, an alignment film is formed at a portion where the TFT substrate SUB sandwiches the liquid crystal layer with the counter substrate. After an alignment film material is applied and baked, the alignment film is subjected to a rubbing treatment (treatment of rubbing with nylon fiber cloth), whereby an anchoring force for aligning the liquid crystal molecules included in the liquid crystal layer in a predetermined direction is given.

In this case, since the alignment film material is not applied on the end of the TFT substrate SUB where the conductive region CR or the like is formed, and the conductive region CR is exposed, static electricity is generated due to friction. In a rubbing step of applying a rubbing treatment, since the ground terminal AT is not connected to the FPC, static electricity accumulated in the conductive region CR suddenly flows from the ground terminal AT to the adjacent terminal NT in some cases.

The conductive region CR on the TFT substrate SUB is formed to have a relatively larger area compared to other terminals, for the connection with the conductive member CT. The amount of the static electricity suddenly flowing to the adjacent terminal NT increases as the conductive region CR is larger in area. Therefore, in the peripheral circuit connected to the adjacent terminal NT, electrostatic damage easily occurs in a thin film transistor functioning as a switching element formed at a position where the distance of wiring between the thin film transistor and the adjacent terminal NT is short. The electrostatic damage easily occurs particularly in a thin film transistor which is directly supplied with a signal from the adjacent terminal NT and which has a shorter wiring length from the adjacent terminal NT. In addition, the electrostatic damage occurs easier in a non-diode-connected transistor (thin film transistor in a state where a gate electrode is insulated from a source electrode and a drain electrode) than in a diode-connected thin film transistor (thin film transistor in a state where a gate electrode is connected to a source electrode or a drain electrode).

Figure 3:
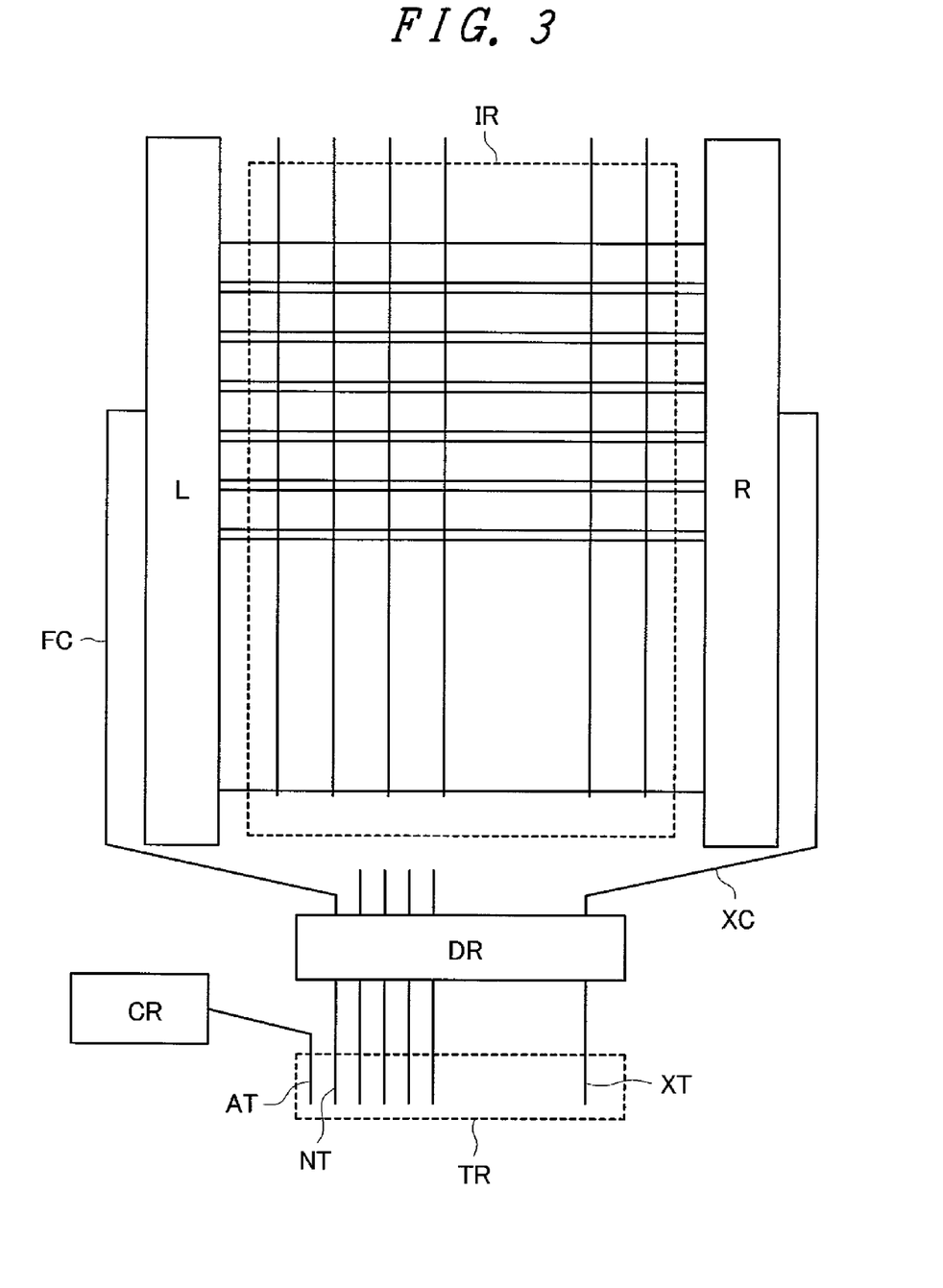
FIG. 3 schematically shows positions where a pixel circuit, the peripheral circuits thereof, a terminal region connected to an FPC, and the like are formed in the TFT substrate according to the first embodiment of the invention.

FIG. 3 schematically shows the positional relationship among a pixel circuit forming region (display region) IR, a peripheral circuit region L and a peripheral circuit region R provided on sides of the pixel circuit forming region, the conductive region CR, the terminal region TR, the driver region DR, and the like in the TFT substrate SUB. The adjacent terminal NT is connected to any of peripheral circuits in the peripheral circuit region L with a first wiring FC through the driver region DR. More specifically, the first wiring FC is installed along the peripheral circuit region L so as to extend from the first side of the TFT substrate SUB where the terminal region TR is present in a direction (hereinafter referred to as first direction) toward a second side (present on a side opposite to the first side on the TFT substrate SUB) facing the first side and connected to the peripheral circuit. The peripheral circuit region L is provided on a third side, and the peripheral circuit region R is provided on a fourth side. Accordingly, the first wiring FC is installed along the third side. The first wiring FC is extended at least to a position which is a middle point of the third side in the TFT substrate in the first direction and then connected to any of the peripheral circuits in the peripheral circuit region L. Since the first wiring FC is extended at least to the middle point, the resistance of wiring reaching a thin film transistor (first thin film transistor having a gate electrode insulated from a source electrode and a drain electrode) which is sensitive to electrostatic damage among thin film transistors which are directly supplied with signals from the adjacent terminal NT through the first wiring FC increases. Therefore, the electrostatic damage is prevented. The first wiring FC may be extended to a position closer to the second side than the pixel circuit forming region IR and connected to any of the peripheral circuits in the peripheral circuit region L. In this case, since the wiring length of the first wiring FC can be made longer, electrostatic damage is prevented more reliably.

As shown in FIG. 3, a symmetrical wiring XC connected to any of peripheral circuits in the peripheral circuit region R is provided in the embodiment. The symmetrical wiring XC is connected to a symmetrical peripheral circuit provided at a symmetrical position in the peripheral circuit region R with respect to the peripheral circuit to which the first wiring FC is connected with the pixel circuit forming region IR as a reference. The symmetrical wiring XC supplies the symmetrical peripheral circuit with signals and power source which control the same kind of control objects as the signals and power source supplied by the adjacent terminal NT do.

In this case, it is desirable that the symmetrical wiring XC be extended to a similar position to the first wiring FC and connected to a symmetrical peripheral circuit in the peripheral circuit region R. Thus, the timing of the peripheral circuit connected with the first wiring FC can be adjusted to the timing of the symmetrical peripheral circuit connected with the symmetrical wiring XC.

Since a terminal XT connected to the symmetrical wiring XC is provided at a position not adjacent to the ground terminal AT, electrostatic damage can hardly occur in the symmetrical peripheral circuit connected to the wiring XC in the peripheral circuit region R. Accordingly, when the timing or the like between the first wiring FC and the symmetrical wiring XC presents no problem, the wiring XC may not be installed along the side of the peripheral circuit region R but may be connected to the symmetrical peripheral circuit in the vicinity of the terminal region TR, for example.

Figure 4:
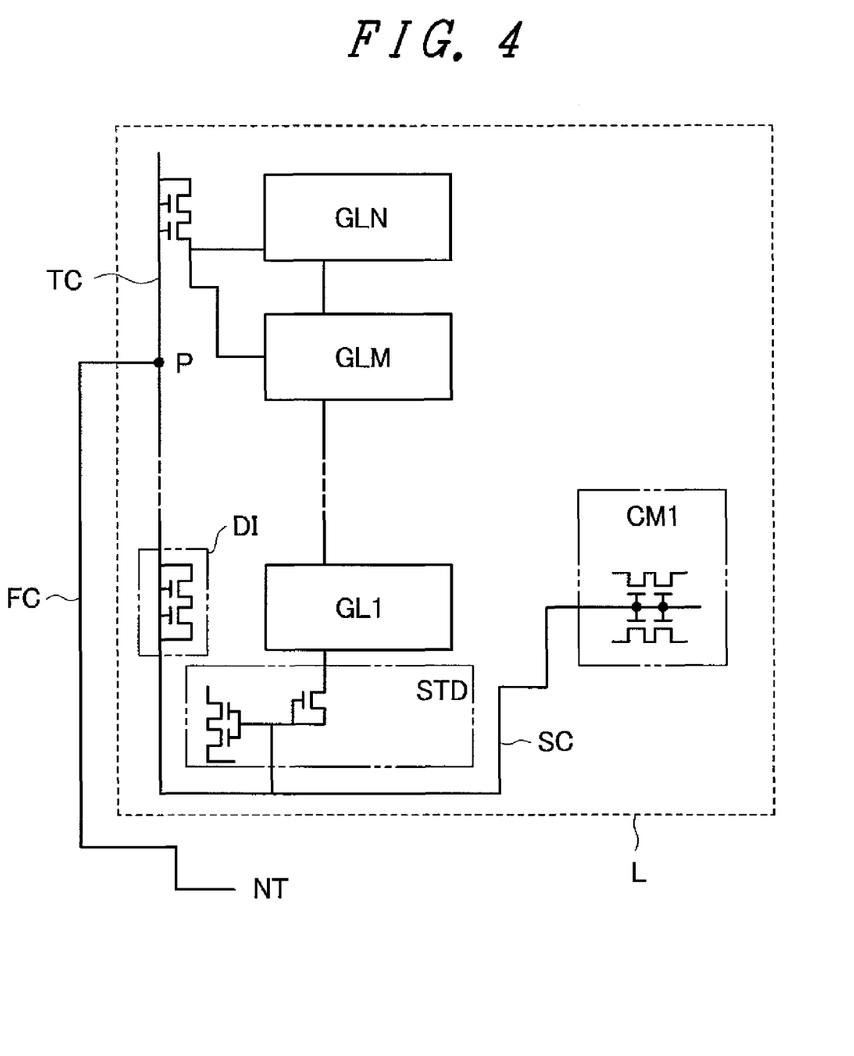
FIG. 4 shows a part of a peripheral circuit connected with a wiring which is installed from an adjacent terminal according to the first embodiment of the invention.

FIG. 4 shows the case where a signal (start pulse, for example) is supplied from the adjacent terminal NT through the first wiring FC, showing the state where the first wiring FC installed from the adjacent terminal NT in the embodiment is connected to a peripheral circuit and further connected to a circuit STD and a common line drive circuit CM1 which are directly supplied with a start pulse. As shown in FIG. 4, the first wiring FC is connected to a peripheral circuit at a connection point P. A second wiring SC is installed so as to extend from the connection point P in a direction (hereinafter referred to as second direction) toward the first side where the terminal region TR is provided and connected to the circuit STD and the common line drive circuit CM1 which are directly supplied with the start pulse.

As shown in FIG. 4, the circuit STD which is directly supplied with a start pulse includes the first thin film transistors each having a gate electrode insulated from a source electrode and a drain electrode and a so-called diode-connected thin film transistor (second thin film transistor). The first thin film transistor functions as a switching element. For example, when a voltage significantly larger than a predetermined voltage is applied to the gate electrode, an insulating film interposed between the electrodes is damaged to cause a short in the circuit in some cases (that is, sensitive to electrostatic damage). On the other hand, in the second thin film transistor, even when a large voltage is applied to the gate electrode, the application of voltage to the gate electrode reduces the resistance between the source electrode and the drain electrode. Therefore, current flows from one of the electrodes electrically conducted to the gate electrode to the other electrode, causing no damage to an insulating film (that is, not sensitive to electrostatic damage).

In the peripheral circuit region L, scanning line drive circuits and common line drive circuits are provided corresponding to the pixels arranged in the X-direction in the pixel circuit forming region IR. For the circuit STD which is directly supplied with a start pulse, a start pulse as a trigger for sequentially scanning and driving scanning line drive circuits GL1 to GLN is directly supplied. A shift register (not shown) is provided in each of the scanning line drive circuits. Each of the scanning line drive circuits receives two signals different in phase from each other by 180 degree from a wiring different from that shown in FIG. 4 and sequentially selects a scanning line to be driven. The scanning line drive circuits GL1 to GLN sequentially scan in a direction from the GL1 to the GLN.

A third wiring TC is installed from the connection point P toward the second side. The third wiring TC is provided on a side close to the second side in the peripheral circuit region L and connected to the scanning line drive circuits GLM and GLN furthest from the first side. After the scanning line drive circuit GLN is driven, the scanning line drive circuit GL1 is driven again.

As shown in FIG. 4, the common line drive circuit CM1 is formed to include four first thin film transistors each having a gate electrode insulated from a source electrode and a drain electrode. In these first thin film transistors, dielectric breakdown occurs in some cases (that is, sensitive to electrostatic damage) in the same manner as in the first thin film transistor functioning as a switching element provided in the circuit STD which is directly supplied with a start pulse. This is because a start pulse is directly supplied also to these first thin film transistors.

Each of the common line drive circuits has a function for converting a common voltage which includes two kinds of voltages at, for example, high and low levels into AC and switching them. The common voltage is switched between high and low levels in conjunction with the timing of driving the scanning line. Since the common signal line must be synchronized with the scanning signal line, the scanning line drive circuit GL1 and the common line drive circuit CM1 are connected in parallel with each other in the embodiment. Although not shown, common line drive circuits CM2 to CMN are provided corresponding to the scanning line drive circuits GL2 to GLN other than the scanning line drive circuit GL1. Since there is no thin film transistor which is directly supplied with a start pulse and sensitive to electrostatic damage in the common line drive circuits CM2 to CMN, the description thereof is omitted.

The static electricity suddenly flowing from the ground terminal AT to the adjacent terminal NT goes through the first wiring FC, the connection point P, and the second wiring SC, thereby reaching the circuit STD and the common line drive circuit CM1 which are directly supplied with a start pulse, under the conditions where a signal is attenuated because of relatively long wiring. Therefore, voltage applied to the thin film transistors functioning as switching elements provided in the circuits is lowered, hardly causing electrostatic damage.

As shown in FIG. 4, the second wiring SC is provided with diode-connected second thin film transistors DI between the connection point P and the circuit STD which is directly supplied with a start pulse. The second thin film transistor DI may be provided as many as the number of, for example, the scanning line drive circuits. Since charges are accumulated in the second thin film transistor DI, the wiring load of the second wiring increases. As a result, electrostatic damage hardly occurs in the circuit STD or the like which is directly supplied with a start pulse.

Second Embodiment

Figure 5:
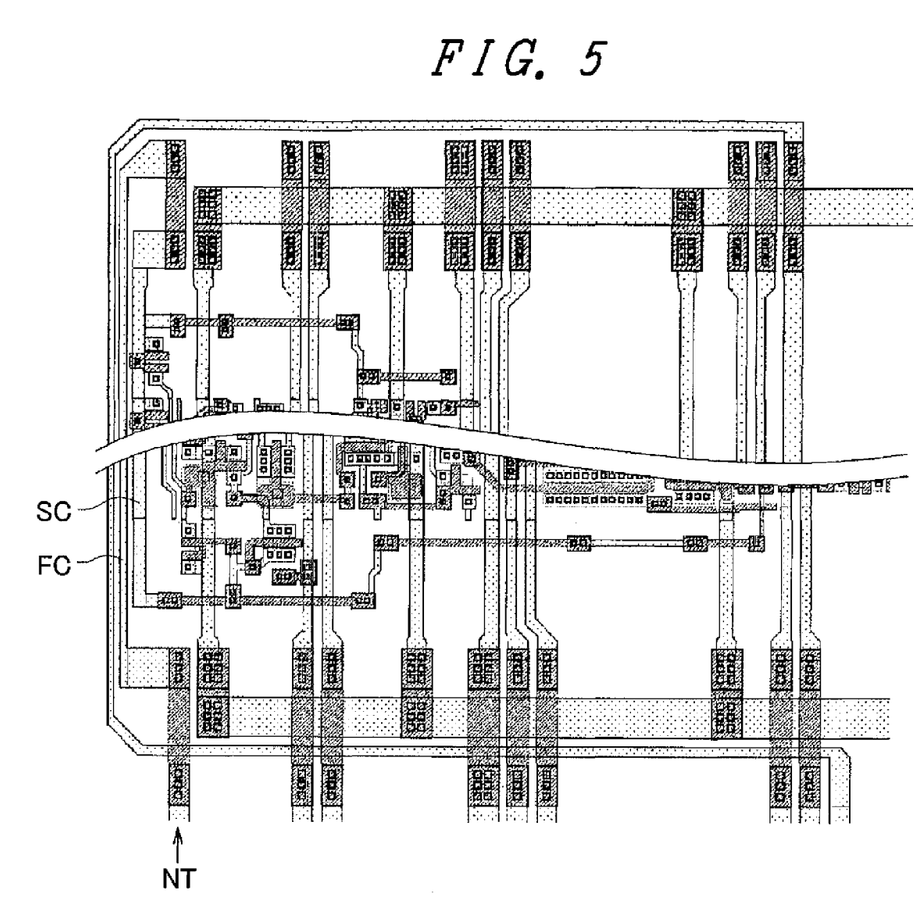
FIG. 5 shows a layout of a part of a peripheral circuit of a TFT substrate SUB according to a second embodiment of the invention.

FIG. 5 shows an example of a layout of a peripheral circuit formed in the peripheral circuit region L of the TFT substrate SUB in a second embodiment. The first embodiment shows an example in which the first wiring FC is extended at least to the position which is the middle point of the third side in the TFT substrate SUB in the first direction and connected to any of the peripheral circuits in the peripheral circuit region L. On the other hand, in the second embodiment, the first wiring FC is connected to a peripheral circuit at an end of the peripheral circuit region L on the second side, and the second wiring SC is installed so as to extend from the end on the second side in a direction toward the first side as shown by the layout in FIG. 5. Except for this point, the second embodiment is substantially the same as the first embodiment. The end of the peripheral circuit region L on the second side is located on a side closer to the second side than an end of the pixel circuit forming region IR on the second side.

In the first and second embodiments, the circuit STD and the common line drive circuit CM1 which are directly supplied with a start pulse are connected in parallel with the second wiring SC for establishing synchronization. However, synchronization may be established by another method, so that the circuit STD and the common line drive circuit CM1 which are directly supplied with a start pulse may not be connected in parallel.

In the first embodiment, the first wiring FC is extended at least to the position which is the middle point of the third side in the TFT substrate SUB in the first direction. However, the first wiring FC may be extended at least to a position which is a middle point of the pixel circuit forming region IR or the peripheral circuit region L. Further, a position to which the first wiring FC is extended may be determined in view of the wiring length which hardly causes dielectric breakdown in a peripheral circuit and the amount of delay of signal or the like in a peripheral circuit.

The invention may be applied to a liquid crystal display device having no common line drive circuit.

Further, the invention is not limited to an IPS type and may be applied to other liquid crystal display device which is sensitive to electrostatic damage.

What is claimed is:
1. A liquid crystal display device comprising:
   a TFT substrate on which a pixel circuit and peripheral circuits of the pixel circuit are formed; and
   a counter substrate which is arranged to face the TFT substrate with a liquid crystal layer sandwiched between the counter substrate and the TFT substrate and has an area smaller than that of the TFT substrate, wherein
   the TFT substrate includes an alignment film subjected to a rubbing treatment,
   the counter substrate includes a transparent conductive film covering at least a region where the pixel circuit is formed in the TFT substrate on a surface opposite to the liquid crystal layer,
   the TFT substrate includes a conductive region electrically conducted to the transparent conductive film through a conductive member and a terminal region connected to a flexible printed board, on a first side which is not covered with the counter substrate,
   the terminal region includes a ground terminal which is connected to the conductive region for supplying a ground potential and an adjacent terminal which is adjacent to the ground terminal and supplies signals or power source to the peripheral circuit,
   the adjacent terminal is connected to the peripheral circuit provided on a third side through a first wiring which is installed along the third side from the first side toward the second side facing the first side, and the first wiring is extended at least to a position which is a middle point of the third side in the TFT substrate in a direction from the first side toward the second side and then connected to the peripheral circuit.

2. The liquid crystal display device according to claim 1, wherein
the peripheral circuit connected to the adjacent terminal includes a second wiring which is installed from a position of connecting the first wiring toward the first side, and
a first thin film transistor having a gate electrode insulated from a source electrode and a drain electrode, among thin film transistors directly supplied with signals from the adjacent terminal, is connected to any electrode of the source electrode, the drain electrode, and the gate electrode through the second wiring.

3. The liquid crystal display device according to claim 2, wherein
the second wiring is connected to at least one diode-connected second thin film transistor between a position of connecting the first wiring and a position of connecting the first thin film transistor.

4. The liquid crystal display device according to claim 1, wherein
the first wiring is extended at least to a position which is closer to the second side than the region where the pixel circuit is formed in the TFT substrate and connected to the peripheral circuit.

5. The liquid crystal display device according to claim 1, wherein
the pixel circuit includes a plurality of scanning signal lines, and
the adjacent terminal supplies a start pulse for a circuit driving the scanning signal line.

6. The liquid crystal display device according to claim 1, wherein
the pixel circuit includes a plurality of common signal lines, and
the peripheral circuit connected to the adjacent terminal AC-drives the common signal line.

7. The liquid crystal display device according to claim 1, wherein
the peripheral circuit includes a symmetrical peripheral circuit which is paired with the peripheral circuit connected to the first wiring and provided on a fourth side which is a position symmetrical to the peripheral circuit with the region where the pixel circuit is formed as a reference,
the symmetrical peripheral circuit is supplied with signals or power source through a symmetrical wiring which is installed along the fourth side from the first side toward the second side, and
the symmetrical wiring is extended at least to a position which is a middle point of the fourth side in the TFT substrate in a direction from the first side toward the second side and then connected to the symmetrical peripheral circuit.

* * * * *